United States Patent
Reigneau

(10) Patent No.: US 10,082,911 B2
(45) Date of Patent: Sep. 25, 2018

(54) SCROLLING INPUT DEVICE

(71) Applicant: STMICROELECTRONICS (RESEARCH & DEVELOPMENT) LIMITED, Marlow (GB)

(72) Inventor: Mathieu Reigneau, Amilly (FR)

(73) Assignee: STMICROELECTRONICS (RESEARCH & DEVELOPMENT) LIMITED, Marlow-Buckinghamshire (GB)

( * ) Notice: Subject to any disclaimer, the term of this patent is extended or adjusted under 35 U.S.C. 154(b) by 0 days.

(21) Appl. No.: 15/806,851

(22) Filed: Nov. 8, 2017

(65) Prior Publication Data
US 2018/0067576 A1    Mar. 8, 2018

Related U.S. Application Data

(63) Continuation of application No. 12/973,539, filed on Dec. 20, 2010, now Pat. No. 9,841,842.

(30) Foreign Application Priority Data

Dec. 21, 2009  (GB) .................................. 0922247.2

(51) Int. Cl.
*G06F 3/042* (2006.01)
*G06F 3/0354* (2013.01)

(52) U.S. Cl.
CPC .......... *G06F 3/042* (2013.01); *G06F 3/03543* (2013.01); *G06F 3/0421* (2013.01); *G06F 3/0428* (2013.01); *G06F 2203/04109* (2013.01)

(58) Field of Classification Search
CPC ................ G06F 3/042; G06F 3/03543; G06F 2203/04109; G06F 3/0421; G06F 3/0428
See application file for complete search history.

(56) References Cited

U.S. PATENT DOCUMENTS

| | | |
|---|---|---|
| 5,657,056 A | 8/1997 | Izumi et al. |
| 6,011,860 A | 1/2000 | Fujieda et al. |
| 7,001,060 B1 | 2/2006 | Kimura |
| 8,243,097 B2 | 8/2012 | Pantfoerder |
| 2005/0200853 A1 | 9/2005 | Mori et al. |
| 2008/0007540 A1 | 1/2008 | Ostergaard |

(Continued)

FOREIGN PATENT DOCUMENTS

WO     2005029394 A2    3/2005

*Primary Examiner* — Carolyn R Edwards
*Assistant Examiner* — Saifeldin Elnafia
(74) *Attorney, Agent, or Firm* — Slater Matsil, LLP

(57) ABSTRACT

An input device may include an image sensor having an imaging surface comprising that includes an array of pixels, and an optical waveguide layer carried by the imaging surface and having an exposed user surface and a first refractive index associated therewith. The input device may also include a substrate between the optical waveguide layer and the image sensor and having a second refractive index associated therewith that is lower than first refractive index. A collimation layer may be between the image sensor and the substrate. A light source may be configured to transmit light into the optical waveguide so that the light therein undergoes a total internal reflection. The optical waveguide may be being adjacent the imaging surface so that an object brought into contact with the exposed user surface disturbs the total internal reflection results resulting in an image pattern on the imaging surface.

17 Claims, 2 Drawing Sheets

(56) References Cited

U.S. PATENT DOCUMENTS

| | | |
|---|---|---|
| 2008/0150848 A1 | 6/2008 | Chung et al. |
| 2009/0103853 A1 | 4/2009 | Daniel |
| 2010/0060578 A1 | 3/2010 | Chen et al. |
| 2010/0078545 A1 | 4/2010 | Leong et al. |

SCROLLING INPUT DEVICE

CROSS-REFERENCE TO RELATED APPLICATIONS

This application is a continuation of U.S. patent application Ser. No. 12/973,539 filed on Dec. 20, 2010, entitled "Scrolling Input Device," which claims priority to Great Britain Application No. 0922247.2, filed Dec. 21, 2009, which applications are hereby incorporated herein by reference.

TECHNICAL FIELD

This invention relates to an input navigation device for computers, mobile phones, and the like, which is operated in a scrolling manner by moving a finger on its surface, sometimes referred to as a fingermouse.

BACKGROUND

A known fingermouse, or finger navigation device operated in a scrolling manner is capacitance based. The capacitance based device generally does not operate satisfactorily if the finger is covered, for example, by a glove. Moreover, the size of the capacitance based device may be large in relation to other devices, such as, a mobile phone, and a personal digital assistant (PDA).

An optical navigation device is also known, which operates on the same principles as optical mice by comparing successive frames of an area image. The optical navigation device tends to be smaller, but there is typically a practical limit on reducing thickness because of the minimum focal length to form an image on the surface of an image sensor.

Thus, it may be desirable to provide a fingermouse navigation device which can be manufactured with a reduced thickness. It is also desirable to manufacture such a device in a relatively simple manner and with a relatively low part count.

SUMMARY

In view of the foregoing background, it is therefore an object of the present invention to provide an input device having a reduced thickness and reduced part count, and that may be manufactured by a relatively simplified process.

This and other objects, features, and advantages in accordance with the present invention are provided by a scrolling input device that may include an image sensor having an imaging surface having an array of pixels. The scrolling input device may also include an optical waveguide layer over the imaging surface and having an exposed user surface. The scrolling input device may also include a substrate layer between the optical waveguide layer and having a lower refractive index than the optical waveguide layer. A light source may transmit light into the optical waveguide so as to undergo total internal reflection therein. The optical waveguide may be sufficiently close to the imaging surface so that an object brought into contact with the exposed user or contact surface to cause frustrated total internal reflection may result in an image pattern on the imaging surface.

The optical waveguide layer and the substrate layer may be formed on top of the imaging surface. Alternatively, the optical waveguide layer and the substrate may be formed integrally with the imaging surface.

Each of the optical waveguide layer and the substrate layer may include a polymer or a metal oxide. Suitable polymers may include polycarbonate, poly(methyl methacrylate) (PMMA), or epoxy. Preferably, each of the optical waveguide layer and the substrate layer may have a thickness less than 20 pm. This may allow the formation of a suitable image from a fingerprint.

The light source may be a light-emitting diode. The light-emitting diode may be attached to an angled extension of the optical waveguide, or formed integrally with the image sensor. Alternatively, the light-emitting diode may communicate with the waveguide via a fiber optic arrangement. A collimation layer, such as an array of microlenses or an array of micro optical fibers, may be between the image sensor and the substrate, or may itself form the substrate.

Another aspect is directed to a method of providing a user input to an electronic apparatus. The method may include providing an input device including an image sensor having an imaging surface having an array of pixels, an optical waveguide layer over the imaging surface and having an exposed user, or contact surface, and a substrate layer between the optical waveguide layer and having a lower refractive index than the optical waveguide layer. A light source may transmit light into the optical waveguide so as to undergo total internal reflection therein. The optical waveguide may be sufficiently close to the imaging surface so that an object brought into contact with the exposed user surface to cause frustrated total internal reflection may result in an image pattern on the imaging surface.

The method may include bringing an object into contact with the exposed user or contact surface, and moving the object across the exposed user surface. The method may also include deriving user input information from sequential frames of an image formed at the imaging surface.

The object typically is a human finger. The object is preferably moved in a two-dimensional space, and the input information may be in vectorial form. A further aspect is directed to a method of making a scrolling input device. The method may include providing a solid state image sensor chip having an imaging surface, and forming a substrate layer across the imaging surface. The method also may include forming an optical waveguide across the substrate layer so as to provide an exposed user or contact surface. The substrate layer may have a lower refractive index than that of the optical waveguide. The method may further include attaching a light source to the optical waveguide in a position to transmit light into the waveguide to undergo total internal reflection. The optical waveguide may be sufficiently close to the imaging surface so that an object brought into contact with the exposed user or contact surface to cause frustrated total internal reflection results in an image pattern on the imaging surface.

Preferably, the substrate layer and the optical waveguide layer may each be formed by deposition such as spin coating deposition or chemical vapor deposition.

This advantageously simplifies manufacturing.

Another aspect is directed to an electronic apparatus including the device defined above. The electronic apparatus may, for example, be a mobile phone, a PDA, a portable sound reproducing apparatus, a computer, a remote control, a game controller, or a mouse, for example.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
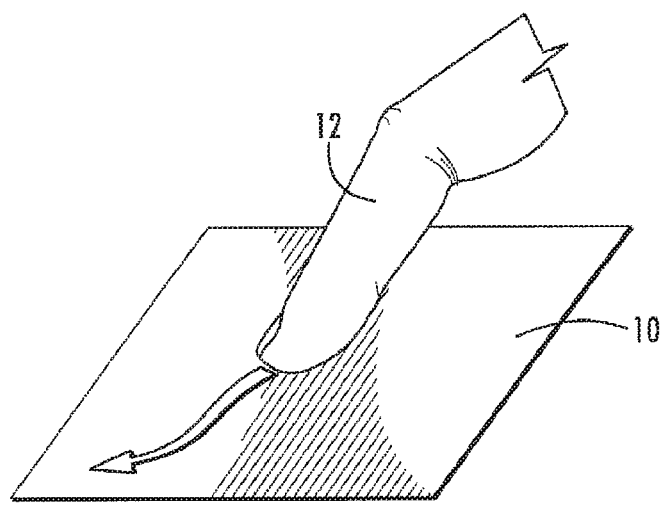
FIG. 1 is a schematic perspective view of a finger navigating device in accordance with the present invention.

An embodiment of the invention will now be described, by way of example only, with reference to the drawings, wherein, like numbers refer to like elements throughout, and prime notation is used to indicate similar elements in alternative embodiments. As seen in FIG. 1, the device 10 is operated by sliding a finger 12 (or another object) across a top surface of the device 10. As in conventional devices, the movement is tracked and translated into vector information. However, in the present embodiments no lens is used to form an image, and the surface can be placed relatively close to the image sensor.

Figure 2:
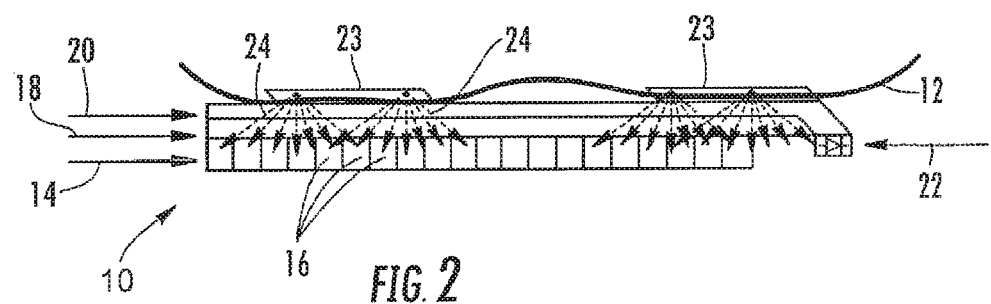
FIG. 2 is a cross-section of part of the device of FIG. 1.

Referring to FIG. 2, the device 10 comprises an image sensor comprising a single silicon chip 14 having a matrix of pixels indicated schematically by reference numeral 16. The chip 14 may be any suitable form of integrated circuit image sensing chip, typically a complementary metal oxide semiconductor (CMOS) sensor chip.

The chip 14 is overlaid by two layers. A first layer forms a substrate layer 18 of a relatively low refractive index. A second layer forms an optical waveguide 20 of a relatively high refractive index.

Waveguide materials generally have a refractive index in the range 1.5 to 2.0. The waveguide 20 may be formed, for example, from polycarbonate, which has a refractive index of approximately 1.59. The refractive index of silicon is greater than 3, and, thus, forming the waveguide directly on silicon generally does not provide total internal reflection. Therefore the waveguide 20 is separated from the surface of the chip 14 by the substrate layer 18 for which a suitable material is PMMA, which has a refractive index of approximately 1.49.

In general terms, each of the layers 18 and 20 may be formed from polymer or metal oxides. Suitable polymers may include polycarbonate, PPMA, and epoxy.

Silicon nitride has a refractive index of about 1.8. It would thus be possible, therefore, to form a silicon nitride film directly on the silicon to act as a substrate layer and to form the waveguide of a higher-index material, such as a metal oxide. Thus the entire unit may be manufactured in a fabrication process, for example, CMOS. In the present embodiment, however, the substrate layer 18 and the waveguide 20 are formed by applying these layers to a previously fabricated chip by spin coating deposition or by chemical vapor deposition.

A light-emitting diode 22 is mounted to project light into the waveguide 20. The LED 22 may be an infrared LED and emit infrared light, in which case no light will generally be visible in the area of the input device. Alternatively, the LED 22 may emit visible light, in which case a small amount of visible light will generally leak in the vicinity of the finger when the device is operated.

In this embodiment the LED 22 is attached to an angled projection of the waveguide 20 such that the LED 22 emission axis is at right angles to the waveguide. This feature allows the sensor chip 14 and the LED 22 to be soldered at the same height. Alternatively, the LED could be formed on the chip itself, or the LED could be coupled to the waveguide via optical fiber.

When no finger is present on the device 10, light from the LED 22 is typically wholly within the waveguide 20 by total internal reflection. However, when a finger 12 is present, the ridges of the fingerprint are in contact with the surface and cause a frustration or disturbance of the total internal reflection as indicated at 23. Thus localized scattering may result as indicated at 24. Thus a pattern is formed on the image surface of the chip 14, forming an image which can be tracked as the finger moves. The image signal processing to track the movement and derive vector information is well understood from prior art devices and need not be further explained.

Figure 3:
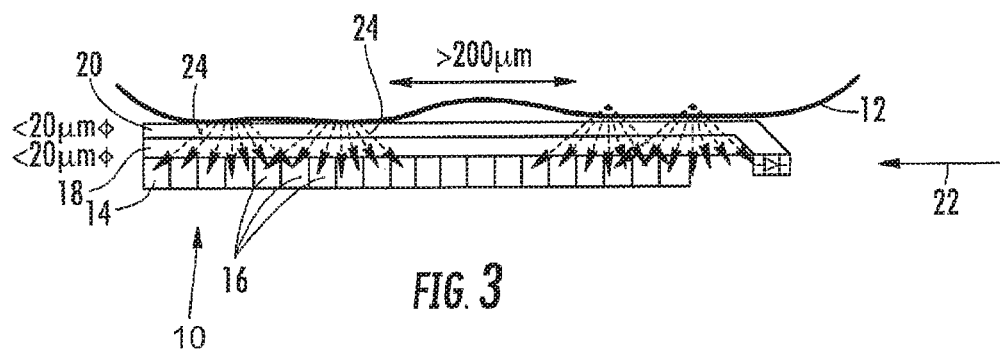
FIG. 3 is a cross-section of the part of the device in FIG. 2 indicating typical dimensions.

For best performance, it is desirable that the object to be imaged is as close as possible to the image sensor to achieve an acceptable picture for tracking movement. The distance between the sensor and the imaged object should typically be small in comparison with the spacing between features of the object. As seen in FIG. 3, the spacing between fingerprint ridges is typically of the order of 200 µm, and an appropriate thickness for the layers 16 and 18 is <20 µm each.

The embodiments have the advantage of simplifying manufacturing. No lens is typically required, and the substrate and waveguide layers may be formed by layer deposition on top of a standard chip.

Figure 4:
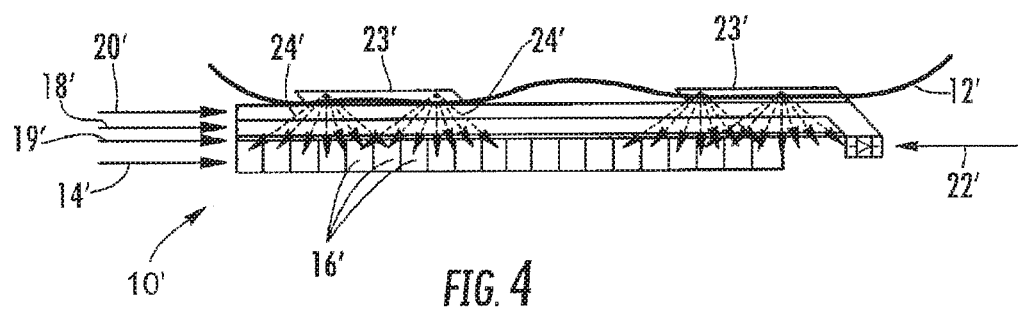
FIG. 4 is a cross-section of part of a finger navigation device in accordance with another embodiment of the present invention.

Modifications of the above embodiment may be made within the scope of the invention. For example, to enhance the quality of the image, another layer 19r which acts as a collimator, may be added between the substrate and the sensor (FIG. 4). For example, the layer may be an array of microlenses or micro optical fiber, or some other feature guiding light straight to the sensor. Alternatively, the collimating layer may, itself, form the substrate to the waveguide.

The embodiments thus provide a scrolling navigation device, which can be made to a thickness, including any required encapsulation and contacts, less than 1 mm. This compares with prior art devices, such as >8 mm for a mechanical trackball and 3 mm for an optical (including a lens) fingermouse. The device is relatively inexpensive to manufacture, and typically requires one chip, one LED, two thin layers of material, and no lens component. Moreover, manufacture generally includes only layer deposition on a chip, with no assembly operations.

Because of the relatively small thickness of the device, which can be achieved by way of the embodiments, the device is particularly useful in hand-held mobile devices, such as, phones, PDAs and personal music players. The device is also useful in computers (especially laptops and notebooks), remote controls, game controllers, and mice.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device, comprising:
an image sensor comprising an array of pixels forming an imaging surface;

an optical waveguide layer disposed over the imaging surface and having an exposed contact surface, the optical waveguide layer having a first refractive index;

a collimation layer disposed between, and in physical contact with, the image sensor and the optical waveguide layer, the collimation layer having a second refractive index that is less than the first refractive index; and a light source configured to project light into the optical waveguide layer, wherein the light undergoes total internal reflection within the optical waveguide layer in an absence of an object being in contact with the exposed contact surface, wherein the light undergoes localized scattering resulting in an image pattern being formed on the imaging surface in response to the object being in contact with the exposed contact surface, wherein the light source is laterally adjacent to the array of pixels.

2. The device of claim 1, wherein the optical waveguide layer comprises a planar portion in physical contact with a major surface of the collimation layer, and an angled extension extending outwardly from the planar portion, wherein the light source is coupled to the angled extension.

3. The device of claim 2, wherein the angled extension is in physical contact with a side surface of the collimation layer.

4. The device of claim 1, wherein a top-most surface of the light source and a top-most surface of the array of pixels are co-planar.

5. The device of claim 1, wherein the optical waveguide layer has a thickness less than 20 μm.

6. The device of claim 1, wherein the first refractive index is between 1.5 and 2.

7. The device of claim 1, wherein the optical waveguide layer comprises a polymer.

8. The device of claim 7, wherein the polymer comprises at least one of a polycarbonate, PMMA, or an epoxy.

9. The device of claim 1, wherein the optical waveguide layer comprises a metal oxide.

10. A device, comprising:
an image sensor comprising an array of pixels forming an imaging surface;
an optical waveguide layer disposed over the imaging surface and having an exposed contact surface, the optical waveguide layer extending beyond an edge of the image sensor;
a collimation layer disposed between, and in physical contact with, the image sensor and the optical waveguide layer, the collimator layer extending beyond the edge of the image sensor; and
a light source laterally spaced apart from the edge of the image sensor, wherein the light source is configured to emit light into the optical waveguide layer, wherein the light undergoes total internal reflection within the optical waveguide layer in an absence of an object being in contact with the exposed contact surface, wherein the light undergoes localized scattering resulting in an image pattern being formed on the imaging surface in response to the object being in contact with the exposed contact surface, wherein the optical waveguide layer has a first refractive index, and wherein the collimation layer has a second refractive index that is less than the first refractive index.

11. The device of claim 10, wherein the optical waveguide layer extends beyond an edge of the collimation layer.

12. The device of claim 10, wherein the light source and the image sensor are soldered at a same height.

13. The device of claim 10, wherein the collimation layer comprises an array of micro-lenses, an array of micro-optical fibers, or a combination thereof.

14. The device of claim 10, further comprising an optical fiber, and wherein the light source is configured to communicate with the optical waveguide layer via the optical fiber.

15. The device of claim 10, wherein a total thickness of a structure formed by the image sensor, the optical waveguide layer, and the collimation layer is less than 1 mm.

16. A method of providing a user input to an electronic apparatus, the method comprising:
determining user input information from sequential frames of an image formed at an imaging surface of an input device based upon an object to be brought into contact with and moved across an exposed contact surface of the input device, comprising:
an image sensor comprising an array of pixels forming the imaging surface;
an optical waveguide layer disposed over the imaging surface, wherein a major surface of the optical waveguide layer forms the exposed contact surface of the input device;
a collimation layer disposed between, and in physical contact with, the image sensor and the optical waveguide layer; and
a light source configured to project light into the optical waveguide layer, wherein the light undergoes total internal reflection within the optical waveguide layer in an absence of the object being in contact with the exposed contact surface, wherein the light undergoes localized scattering resulting in an image pattern being formed on the imaging surface in response to the object being in contact with the exposed contact surface, wherein the optical waveguide layer has a first refractive index, and wherein the collimation layer has a second refractive index that is less than the first refractive index.

17. The method of claim 16, wherein the object is moved in a two-dimensional space across the exposed contact surface, and wherein the user input information comprises vector information.

* * * * *